United States Patent [19]

Visser

[11] Patent Number: 4,700,360

[45] Date of Patent: Oct. 13, 1987

[54] EXTREMA CODING DIGITIZING SIGNAL PROCESSING METHOD AND APPARATUS

[75] Inventor: Arie Visser, Alexandria, Va.

[73] Assignee: Extrema Systems International Corporation, Reston, Va.

[21] Appl. No.: 683,640

[22] Filed: Dec. 19, 1984

[51] Int. Cl.$^4$ ............................................. G10L 1/00
[52] U.S. Cl. ...................................... 375/22; 375/37; 375/122; 380/6; 381/31
[58] Field of Search ....................... 375/22, 25, 28, 34, 375/37, 122, 23; 332/15, 11 D; 329/106; 364/724, 733; 381/41, 47, 29, 31; 179/1.5 R, 1.5 M, 1.5 E; 340/347 AD; 380/6, 41

[56] References Cited

U.S. PATENT DOCUMENTS

| | | | |
|---|---|---|---|
| 2,669,608 | 2/1954 | Goodall | 375/34 |
| 3,136,949 | 6/1964 | Firestone | 332/15 |
| 3,273,141 | 9/1966 | Hackett | 375/28 |
| 3,294,918 | 12/1966 | Gold | 375/22 |
| 3,327,063 | 6/1967 | Remley | 332/15 |
| 3,505,601 | 4/1970 | Slaymaker | 332/15 |
| 3,528,011 | 9/1970 | Anderson | 375/22 |
| 3,855,555 | 12/1974 | Burkhard et al. | 332/11 D |
| 3,912,917 | 10/1975 | Nussbaumer | 364/724 |
| 4,545,065 | 10/1985 | Visser | 381/41 |

OTHER PUBLICATIONS

Journal of the Acoustical Society of America: vol. 20, No. 1, Jan. 1984, pp. 42-51.

Primary Examiner—Benedict V. Safourek
Attorney, Agent, or Firm—Kenyon & Kenyon

[57] ABSTRACT

A system for converting analog input waveforms into digital signals is disclosed. The system reduces the bit rate required for the transmission of signals over a transmission channel such that the reproduced analog signals at the receiver are perceived still to be of subjectively high quality to the human sensory system, e.g., the human ear. The system includes an extrema coder for encoding only the times of occurrence of extrema, or maximum and minimum values in the input analog waveform, including the times of occurrence of naturally occurring or injected substantially random, broadband noise. The output of the extrema coder is coupled to an interface circuit, which in one embodiment, wherein a delta modulator digitizing stage is used, comprises an integrator. The output of the interface circuit is fed to a digitizing stage, e.g., in one embodiment, a delta modulator. The output of the digitizing stage is then coupled to the transmission channel for transmission to the receiver. The receiver includes appropriate decoding circuitry for subjectively reproducing the original analog signal. In another embodiment, a pulse code modulator is used as the digitizing stage and the interface circuit comprises a low pass or bandpass filter. Appropriate pulse code modulation decoder means is provided at the receiver in this embodiment.

54 Claims, 12 Drawing Figures

EXTREMA CODING DIGITIZING SIGNAL PROCESSING METHOD AND APPARATUS

CROSS REFERENCE TO RELATED APPLICATIONS

This application is related to U.S. application Ser. No. 372,538, filed Apr. 28, 1982, now U.S. Pat. No. 4,545,065.

BACKGROUND OF THE INVENTION

1. Field of the Invention

The present invention relates to the field of signal processing, and in particular, relates to the field of signal processing wherein analog waveforms are encoded as digital signals in a manner such that the digital signals can be transmitted over transmission channels of reduced bandwidth and such that the bandwidth of the signal can be reduced while still obtaining high subjective signal quality. More particularly, the invention relates to the field of electronic signal processing wherein the times of occurrence of extrema, or maxima and minima points of an analog waveform, are encoded. The invention further relates to the processes of encoding, transmitting and decoding of information that is supplied to the human sensory system or to mechanisms that are used to simulate the human sensory system. For example, the present invention finds application in voice coding, music coding and video coding, and may be implemented in a coder-decoder (CODEC) system. As an example, the present invention may be used to code voice information digitally at rates of 4.8 to 32 kilobits per second. Music information may be coded digitally at rates as low as 16 kilobits per second, and possibly even lower, with the present invention, and video information may be encoded at rates of from 56 kilobits per second to 1.544 megabits per second.

2. Description of the Prior Art

During the past several years, a number of different systems for converting analog signals to digital signals have been introduced.

In general, such techniques are directed at maintaining a close approximation to the original analog signal, at least at the point where the analog signal is fed to the digitizing stage. Most of these schemes are based upon one of the following methods.

A first technique is known as pulse code modulation (PCM) wherein, samples of the amplitude information of the waveform are taken at usually regular time intervals. The number of samples per second is determined by the bandwidth for the input signal according to the Nyquist relationship, i.e., the sampling rate must be at least twice the frequency of the highest frequency component of the analog signal to be encoded. The accuracy of this process depends also on the resolution of the way in which the amplitude of each sample is encoded. The higher the accuracy, the more bits of information are needed. In general, amplitudes are quantized by comparing each sample with a multitude of predetermined levels.

A second technique is known as delta modulation ($\Delta M$). Delta modulation does not utilize discrete amplitude samples of a waveform. Instead, it relies on the continuous comparison of the input signal with a signal readily reconstructed from a digital format, which is usually applied to an integrating circuit. For example, in delta modulation, typically the input signal present value is compared to a signal which is related to the value of the previous sample, and a digital signal is formed which represents the difference. The output of a delta modulator provides a continuous bit stream having, e.g., a "1" if the reconstructed signal has an amplitude value lower than the input and otherwise a "0".

The accuracy of the delta modulation process again depends on the number of bits per second that are employed. In this case the bit rate will also determine the maximum bandwidth of the input. In $\Delta M$, however, an unweighted code is used, i.e., a "block" of bits or a word, as in PCM, does not represent an amplitude sample. Rather, a one or a zero simply represents the result of the comparison performed by the delta modulator.

The performance of both PCM and $\Delta M$ depends on the bit rate that is allowable. The use of high bit rates is expensive due to circuit complexity and also because channels must be of high quality to pass high bit rates. Furthermore, many times channels of the quality necessary to transmit high bit rates are simply not available. Many attempts have been made to provide the same performance at low bit rates that PCM and $\Delta M$ provide at higher bit rates.

If input signals to either PCM or $\Delta M$ vary in amplitude over only a limited dynamic range, performance will be good at relatively low bit rates. This is the result of the fact that in terms of information, that is, in terms of quantization noise, a signal of little variation can be represented well by few bits. In linear PCM or $\Delta M$, a low level variation will be compared with few amplitude levels, therefore, with low accuracy. A high level variation will be compared with many levels, with a much lower error rate. Improving the signal to quantization noise ratio for low level inputs would require an increase of the transmission bit rate.

A well known solution, but one which has its own limitations and faults, is called companding. A non-linear compression circuit is used to raise low level intensities that are then compared with far more quantization levels. High input amplitudes are attenuated such that the number of comparative levels drops, thus equalizing the encoding resolution for both low and high intensities. The inverse of compression, known as expanding, is then carried out in the decoder.

Non-linear encoding techniques, such as A law PCM, u law PCM and companded $\Delta M$ are also known, but these techniques still require relatively high bit rates to achieve a practical measure of encoding accuracy.

A further step in bit rate reduction has been provided by techniques known as automatic gain control (AGC) and adaptive quantization. For PCM, these systems were introduced as adaptive PCM. The corresponding $\Delta M$ techniques are known as continuously variable slope $\Delta M$ (CVSD) and digitally controlled $\Delta M$.

These techniques use varying quantization levels or varying step levels, determined by some measure of the energy in a signal variation at a particular time. This allows for more accurate quantization as the digitizer is adjusted for each type of signal level.

AGC and adaptive quantization methods suffer from several major drawbacks. For one, the adjustment of the system to the input takes time, during which the system is less effective. A second drawback involves the fact that the measure of energy that is used should be derived from only the signal. Often signals are presented with a high degree of interference or noise in which case the system may adjust itself to the energy in the interference or noise. The desired signal may then be attenuated.

Further data rate reduction for PCM and ΔM systems has been demonstrated by using predictive coding methods. In these techniques, the redundancy of certain waveforms, for example, the repetition of certain characteristics, are used to reduce the amount of information which must be transmitted. These methods are not widely applicable, and are utilized in more narrow fields of application.

Another technique that has been suggested employs dual channels for information transfer. U.S. Pat. No. 4,047,108 describes a system for low bit rate digital transmission of speech signals wherein frequency information is transferred via a first channel and amplitude information via a second. In this reference, delta modulators are used to digitize the speech information.

Another technique, which is the subject of U.S. patent application Ser. No. 372,538, filed Apr. 28, 1982, is extrema coding. Extrema coding exploits certain properties of the human perception system to achieve a substantial reduction of the data rate necessary to transmit information.

Extrema coding relies on the fact that only certain timing features, i.e., the extrema, of a stimulus waveform are required to reconstruct a wave form that can be supplied to the human sensory system in such a manner that subjectively, no inequality with the original signal is experienced by the human receiver.

By only encoding the information in these timing features, a large portion (up to 95%) of the information in the original waveform can be made redundant. Extrema coding techniques may give a data rate reduction factor of from 2 up to a factor of 20. Extrema coding, as such, is not an analog to digital conversion method in itself. Practical embodiments, however, may supply all relevant information about an analog signal in a binary format. This binary sequence may then be fully digitized, as will be explained in more detail below.

One way of digitizing, or synchronizing the extrema coded information to a digital signal, is disclosed in the above U.S. patent application. One method that is suggested therein uses a simple D type flip-flop to synchronize the extrema coded signal to a predetermined clock signal.

Although this technique is simple and supplies signals of superior intelligibility for speech processing purposes, the quality of signals that may be obtained using this technique at low clock rates is relatively low.

Extrema coding relies heavily on the presence of short distances between the transitions of the encoded binary signal as a result of the dominance of wide band noise originally present in the signal or added to the signal. These short distances cannot be encoded properly at low bit rates using the simple D-type flip-flop synchronizing technique. The erroneously encoded distances at low clock rates may cause subjective degradation of the original analog waveform, typically at bit rates below 24 kilobits per second.

SUMMARY OF THE INVENTION

It is an object of the present invention to provide a method and apparatus for digitally encoding analog signals such that the signals may be transmitted at lower data rates than heretofore practiced and with subjectively high quality transmission.

It is a further object of the present invention to provide a digital signal processing technique for analog waveforms which combines conventional analog to digital conversion techniques with extrema coding techniques.

The present invention provides a signal processing method and apparatus wherein subjective degradation introduced by digitizing an analog signal can be reduced or eliminated. The problems of handling waveforms of wide amplitude dynamic range and bandwidth, problems normally attributed to PCM and ΔM, can be minimized by using extrema coded signals of limited dynamic range, bandwidth or constant slope as the input to conventional analog to digital encoding stages such as PCM or delta modulators.

These and other objects of the present invention are achieved by an apparatus comprising first means for encoding as an encoded signal only the times of occurrence of maximum and minimum values of the analog waveform, including the times of occurrence of maximum and minimum values of broadband, substantially random noise superimposed on the analog waveform, the encoded signal having a series of transitions between two levels, the transitions representing the times of occurrence, second means coupled to the first means and having the encoded signal as an input for providing a second signal wherein the bandwidth of the encoded signal is reduced and third means for converting the second signal into a digital signal and for transmitting the digital signal over a transmission channel to a receiver.

The present invention also includes within its scope a method for digitizing analog waveforms.

Other objects, features and advantages of the present invention will be apparent from the description which follows.

BRIEF DESCRIPTION OF THE DRAWINGS

The invention will be described in greater detail in the following detailed description with reference to the drawings, in which.

DETAILED DESCRIPTION

Figure 1:
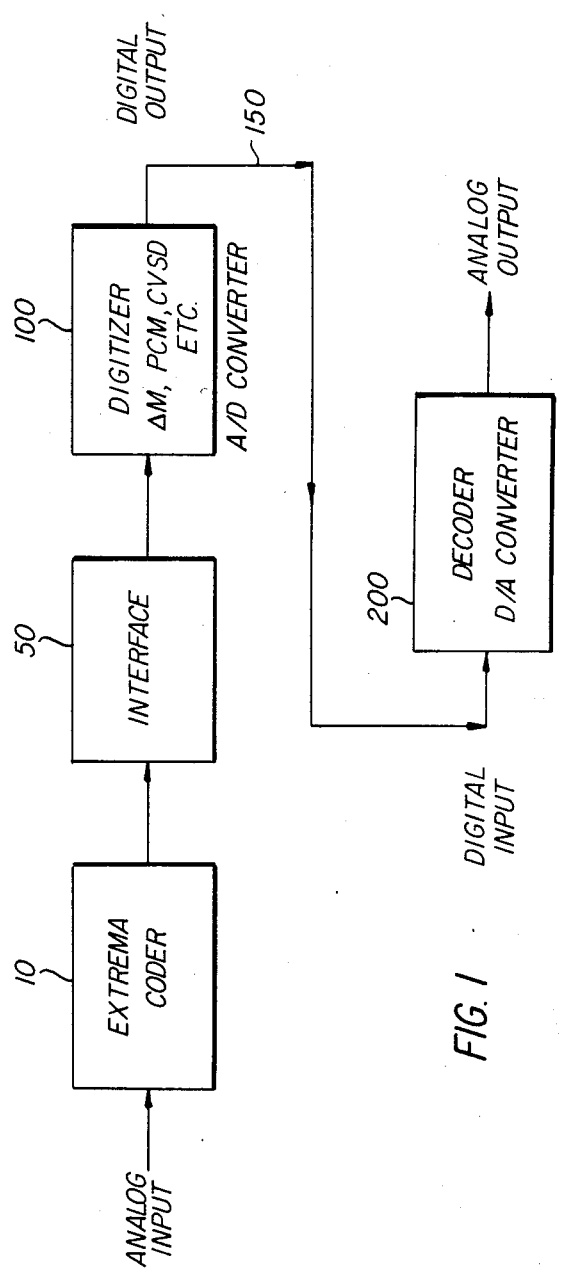
FIG. 1 is a general block diagram of the system according to the invention.

With reference now to the drawings, FIG. 1 shows the general block diagram for the system according to the invention. The transmitter portion of the system comprises an extrema coding stage 10, for example, as described in the above-identified copending U.S. patent application Ser. No. 372,538, an interface stage 50 and a digitizing stage 100. Interface stage 50 couples extrema coded signals to digitizing stage 100, which may be a conventional delta modulator, PCM encoder, or another type of analog to digital conversion stage. The digital output of digitizer 100 is then coupled to the transmission channel 150 and received by decoder 200 located at the receiving end. The decoder comprises a digital to analog converter compatible with the type of digitizer provided at the transmitting end.

Figure 2:
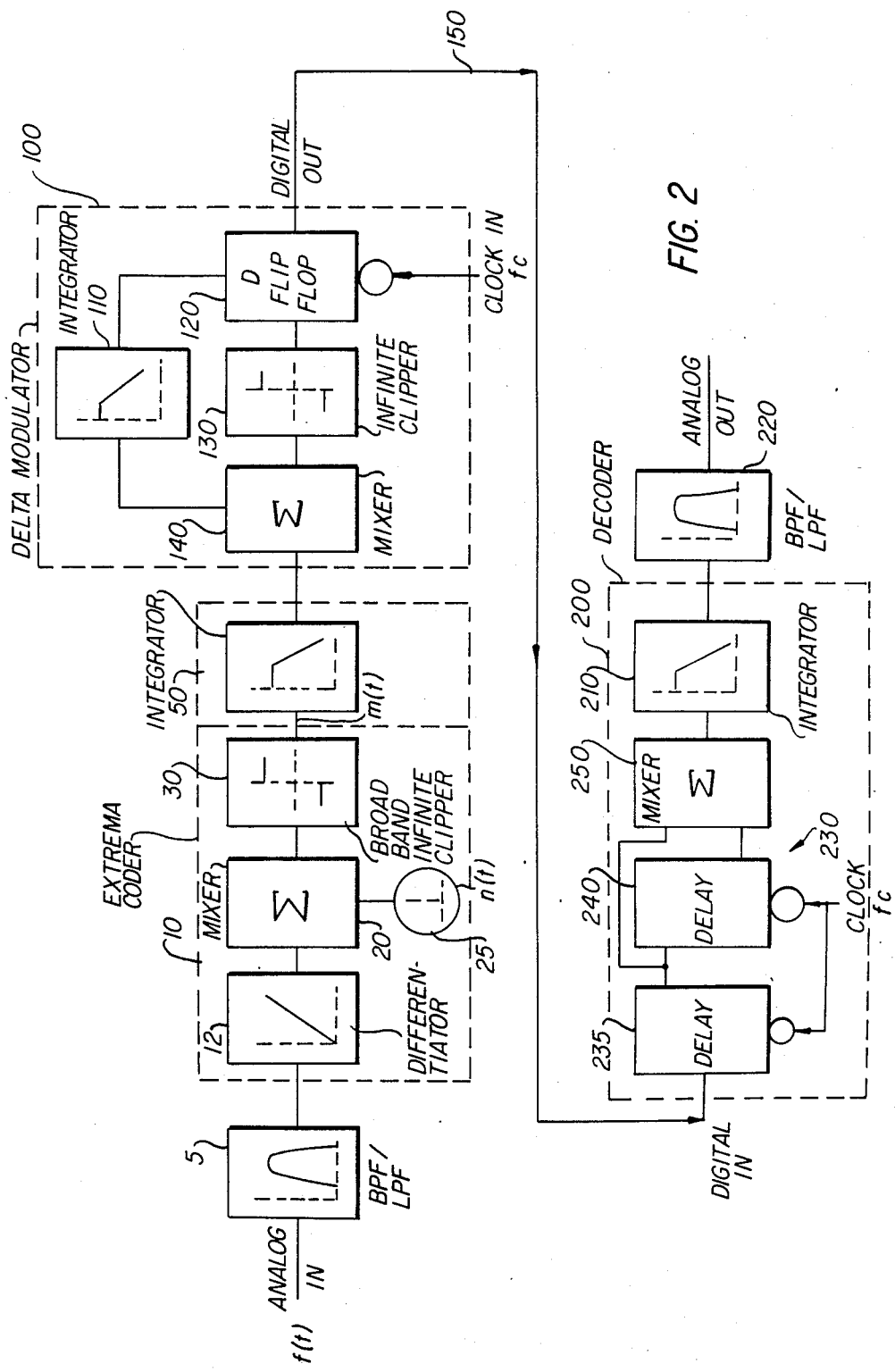
FIG. 2 is a detailed block diagram of one embodiment of the system according to the invention using a delta modulator digitizing stage.

FIG. 2 shows a more detailed block diagram of one embodiment of the invention which is employed in conjunction with a delta modulator type of digitizing stage. The analog input signal f(t) is fed first to a bandpass filter 5, having, for example, a bandpass of from 300 Hz to 3 kHz. Alternatively, a low pass filter can be used having a 3 kHz cut-off. The output of the filter is then fed to an extrema coding stage as described, for example, in the above-identified co-pending U.S. patent application. The extrema coder may comprise, for example, a differentiating stage 12, a mixing or adding stage 20 wherein random noise from a noise generator 25 is added to the differentiated signal if sufficient broadband random noise is not present in the input analog signal, and a broadband infinite clipping stage 30. The extrema coding stage converts the times of occurrence of extrema in the analog input signal to a series of transitions. The output signal m(t) from the broadband clipper thus is a binary signal wherein each transition between a positive and a negative signal level or vice versa represents an extrema, i.e., a maxima or minima, in the original analog input signal. This is accomplished by first differentiating the signal, which emphasizes the high frequency content of the original analog input signal, including the broadband noise superimposed thereon, and converts all maxima and minima in the analog signal and noise to zero crossings. The noise from noise generator 25 may be added to the analog input signal either before or after the differentiation occurs, and is typically added if insufficient broadband random noise is present in the analog signal. As shown in FIG. 2, the noise may be added after the differentiator. The signal at the output of mixing stage 20 is therefore a signal wherein all extrema of the input analog signal including the broadband noise superimposed on the input analog signal have been reduced to zero crossings. Clipping stage 30 emphasizes the zero crossings by providing a rapid transition between different levels at every zero crossing. Accordingly, transitions in the extrema coded output signal m(t) represent the extrema of the original analog input signal and the noise superimposed on the analog signal.

The output of the broadband infinite clipping stage 30 is then fed to an integrating stage 50. The integrating stage provides an output signal which has a constant absolute slope (positive or negative) due to the fact that the output of the clipping stage is a binary signal, having only two levels. The output of the integrator is then fed to a conventional delta modulator 100, which might comprise an integrator 110, switching or synchronizing stage 120, such as a D flip-flop, an infinite clipper 130 and a summing or decision stage 140, which together might comprise a comparator for comparing the input extrema coded signal and the reconstructed signal from integrator 110. A clock input signal is fed to the switching stage 120 to synchronize the delta modulated signal to the clock signal. The delta modulator compares the input integrated extrema coded signal with an integrated or reconstructed version of the delta modulated output signal. The delta modulated output signal is then fed on a channel of limited capacity 150 to the receiver which includes decoder 200.

The output of the delta modulator 100 is directed by the clock signal to approximate the input signal. Usually the output looks like a triangular waveform with a constant absolute slope.

Normally, the input signal to a delta modulator has a varying slope. For high intensity signals of finite bandwidth, there will be certain limitations on the maximum slope—the greatest slope of a signal of the maximum intensity at the maximum frequency. The output of the delta modulator must follow this variation if no distortion, also known as slope overload, is to occur. Furthermore, for low intensity signals, the slope may tend to zero or follow the input noise. If the input signal falls below the decision threshold for the delta modulator, the system will produce a constant stream of zeros and ones, but often an asymmetrical stream will occur which is known as idle channel noise or idling noise.

In FIG. 2, the binary signal m(t) at the output of the infinite clipping stage 30 contains all information in the input waveform necessary for the human sensory system to reproduce the analog input signal.

The signal m(t) has a wide frequency spectrum. Many of the short distances between transitions are generated as the result of transitions of the noise waveform either added to the system or originally present in the input analog signal. Not all of these distances are always required in the encoding process because often certain error rates are tolerable. Normally, the entire binary sequence would provide signal recovery at very low error rates. In order to reduce the amount of information which must be transmitted over the information channel, however, some of these transitions may be discarded.

The integrating stage 50 filters out many of the shorter distances in the extrema encoded signal m(t), and further provides a signal of limited constant absolute slope, as discussed above. This is most desirable as an input signal to a delta modulator. High intensity inputs will therefore not cause slope overload because the input signal to the delta modulator has a limited constant absolute slope. Accordingly, the delta modulator will provide a digital output signal which will carefully follow the input signal with high accuracy. If a high bit rate is provided, i.e., the clock signal is of high frequency, the low intensity input signals, giving shorter distances between transitions, will be encoded with a high resolution, thus giving a very high overall signal to noise ratio.

At low bit rates, for speech, below approximately 12 kilobits per second, the shorter distances will cause some errors. This type of quantization noise, however, is limited by the following factors.

First, the extrema coder signal processor 10 may provide information about the background of the original signal in the form of the background noise. The background noise may provide a noise signal having slopes of sufficient length to be adequately represented, even after integration. Experiments have shown that at data rates down to approximately 8 kilobits per second, telephone quality speech can be provided by the system shown in FIG. 2. By effectively providing the correct measure of the noise signal m(t), background noise may be brought up without significant degradation of signal quality.

Secondly, if no input signal is present, the noise signal added to the input may have such properties that slopes will be represented in random fashion, such that the undesired idle channel noise will never occur. The addition of some form of noise or other signal to a delta modulator to eliminate idle channel noise has been suggested in U.S. Pat. Nos. 3,655,555 and 4,142,066.

Because the input signal to the delta modulator has constant absolute slope, and is thereafter digitized by the delta modulator, the decoder at the receiving end may comprise a simple integrator 210 and a bandpass filter 220, having a bandpass between 300 Hz and 3 kHz. Alternatively, a low pass filter having a 3 kHz cut-off can be used in place of the bandpass filter. The decoder may also incorporate a filter 230 comprising two delay stages 235 and 240 and mixing stage 250. A two stage delay filter of this type has been found to be more practical at lower bit rates than other filters, for example, notch or comb filters.

The digitizing apparatus described with reference to FIG. 2 has several benefits. For one, the delta modulator digitizer that is utilized is only required to operate for constant absolute input slopes over a limited dynamic range. This simplifies the design of the delta modulator stage. Secondly, because of the use of the extrema coder, the input analog signal can have high input dynamic range, since all values of the analog input signal are converted to transitions of a binary signal.

Thirdly, the system described may function at varying bit rates of from 25% to 40% of the rates normally necessary for linear PCM or delta modulation systems. The problems encountered with automatic gain control type of systems are not present. Since only the extrema of the input analog signal provide the relevant timing information of the analog waveform, for example, a speech waveform, it can be calculated that data rates of down to 7.2 kilobits per second may be sufficient to transmit subjectively telephone quality speech. Although extrema coding as a method does not normally provide sufficient information to reconstruct an input signal without any amplitude error, a special technique can be utilized to minimize this error. In this technique, a sufficiently high bit rate may be employed to achieve high input/output signal to noise ratios.

The system according to the invention also performs well in high acoustic noise environments, due to the properties of extrema coding, which relies on noise in the encoding process. Furthermore, the system has a high immunity to channel noise as a result of the use of a delta modulator output stage, which outputs a simple one bit nonweighted binary code.

Figure 3:
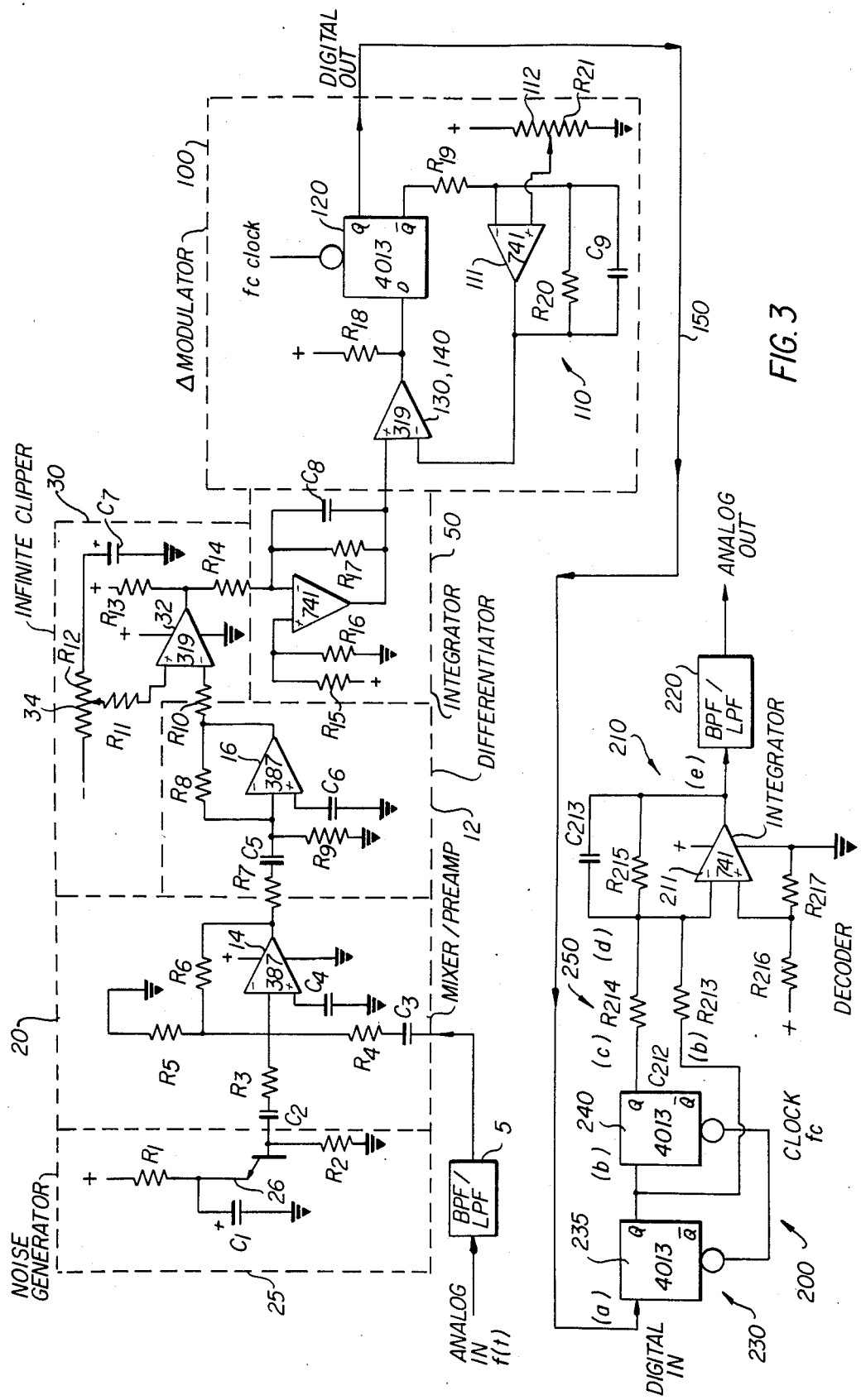
FIG. 3 is a schematic drawing of a circuit embodiment of the system shown in FIG. 2.

Additionally, the circuit required to implement the system shown in FIG. 2 is relatively inexpensive and utilizes relatively few components. An embodiment of the circuit is shown in FIG. 3. As shown in FIG. 3, the analog input signal f(t) enters the bandpass or low pass filter 5 which is not shown in detail. The filtered analog input signal is then coupled into the mixer/preamp stage 20 having a gain of approximately 10 dB, which may comprise a type LM387 operational amplifier. The random noise signal is generated in random noise generator 25 by the base to emitter junction noise of a transistor 26 and coupled to the inverting input of operational amplifier 14 so as to mix with the filtered analog signal. The RMS noise voltage is approximately 10 mV. Operational amplifier 14 performs a voltage gain function. The output of operational amplifier 14 is coupled to a second operational amplifier 16, which also may be a type LM387. This stage differentiates the amplified, filtered analog input signal and noise signal. The output of operational amplifier 16 is then coupled to clipping stage 30, which may comprise a type LM319 operational amplifier comparator. A potentiometer 34 is provided to adjust the threshold level for the infinite clipping stage. The output of infinite clipper 30 is coupled to integrating stage 50 which may comprise, for example, a type LM741 operational amplifier 52. The output of the integrating stage then is coupled to the input of the delta modulator, which may comprise a type LM319 operational amplifier comparator operating as infinite clipping circuit 130 and mixer 140, synchronizing circuit 120 which may comprise a type D flip-flop and feedback integrating circuit 110. A potentiometer 112 is provided to adjust the level of the idle channel noise of the delta modulator. One output of flip-flop stage 120 of the delta modulator is coupled to the low capacity channel 150 for transmission to the receiver 200.

The receiver 200 comprises a decoder including a filter 230 comprising two delay stages 235 and 240. The output of first delay stage 235 is coupled to the second delay stage 240 and also to a mixing network 250. The delay stages each provide a delay equal to one clock period of the clock signal fc. The twice delay signal from delay stage 240 is also coupled to mixing network 250. The output of network 250 is coupled to the inverting input of an integrating stage 210 built around, e.g., a type LM741 operational amplifier 211. The delay stages 235 and 240 may comprise, e.g., D type flip-flops as shown. Flip-flop 235 provides a first amount of delay to the digital input signal, and flip-flop 240 adds a second amount of delay. The once delayed and twice delayed signals are coupled through respective mixing resistors R213 and R214 to the integrator 210.

Figure 4:
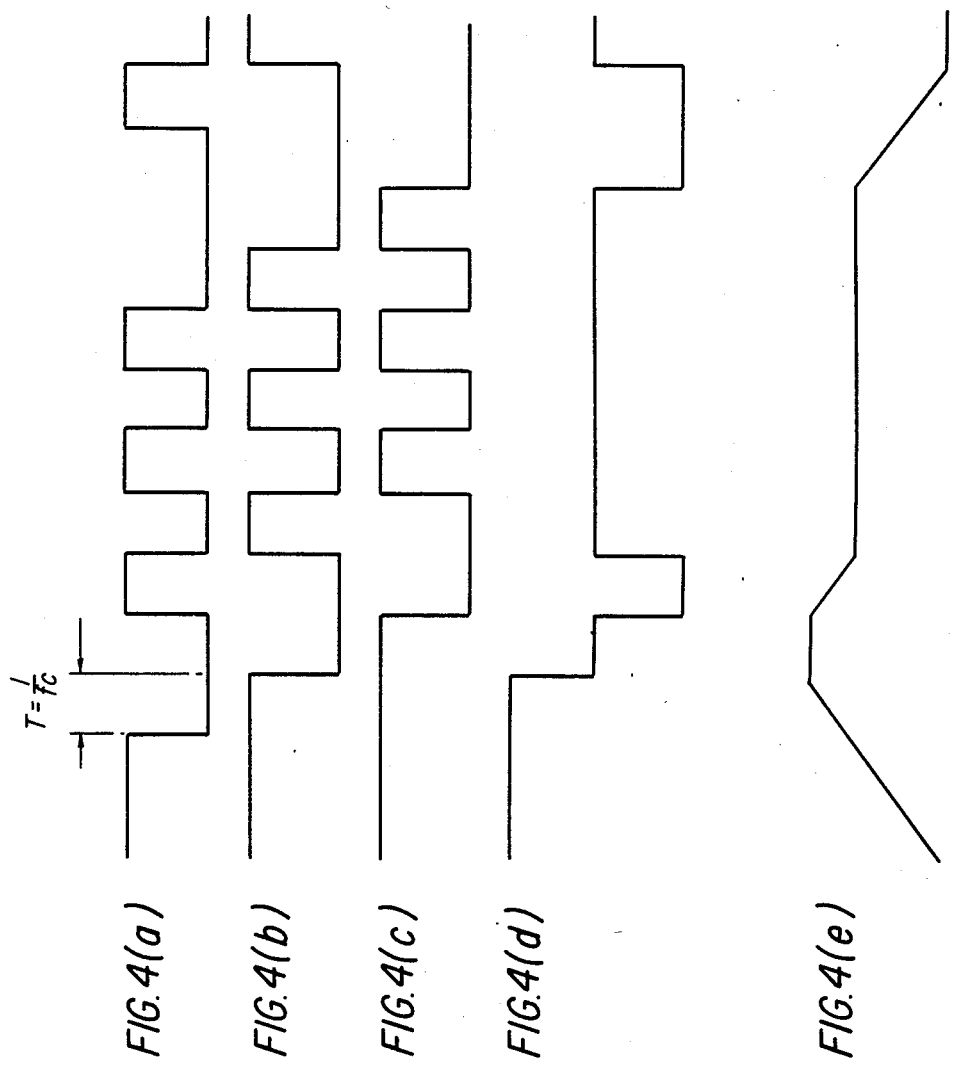
FIGS. 4a thru 4e show graphically signal waveforms for a part of the system shown in FIGS. 2 and 3.

The operation of filter 230 is explained with reference to FIG. 4. FIG. 4 shows the waveforms (a) through (e) identified in FIG. 3. FIG. 4(a) shows the input digital signal. FIG. 4(b) shows the signal delayed by one clock period, i.e., at the output of flip-flop 235. FIG. 4(c) shows the output of flip-flop 240, which is delayed by two clock periods. The summed output of mixing stage 250 is shown in FIG. 4(d), and is a three level signal. If a distance between transitions of the input digital signal is less than one clock period, a zero level will be maintained over one clock period. Distances between transitions longer than one clock period will be shortened by one clock period, during which the signal again will be maintained at a zero level.

Integration by integrator 210 of the signal of FIG. 4(d) gives the signal of FIG. 4(e). Frequency components of fc/2 have been eliminated. All other frequency components that were present are maintained and affected by the integrator. Additionally, the filter will smooth the waveform as the slope will only be reversed following a zero section of one clock period.

Filter 230 thus provides a filter which it has been found to be a preferable form of filter for eliminating the idle channel noise of the delta modulator. For example, if the clock frequency of the delta modulator is 9.6 kilobits per second, an idling noise of one half the clock rate, 4.8 kilobits per second, will occur. Accordingly, a filter having high attenuation at one-half the clock frequency, or 4.8 kilobits per second, will eliminate this idling noise, which occurs in the audible frequency range. High attenuation can be attained at a frequency of one-half the clock rate with the filter described. If the clock rate is 9.6 kilobits per second, high attenuation will be obtained at 4.8 kilobits per second, the frequency of the idle channel noise, thus eliminating the noise.

Accordingly, a digitizer for analog signals, for example, speech or music signals, has been described, which provides a significantly lower transmission bit rate than systems known heretofore and yet which provides signal quality at the receiver comparable to other digitizing systems which require higher transmission bit rates. This is accomplished through the use of an extrema coding preprocessing stage which eliminates all information in the analog signal other than the times of occurrence of extrema in the orginal analog signal and the noise superimposed thereon, an interface stage, which may comprise an integrator, which reduces the number of transitions in the extrema coded signal, but yet which still maintains enough information in the extrema coded signal so that after digitization, the signal can be transmitted at a low bit rate, allowing reproduction of a high quality analog signal at the receiving end. The digitizing stage might be, for example, as described above, a standard delta modulator, which couples an unweighted binary code to the transmission channel.

Component values for the system of FIG. 3 are as indicated in Table 1. All resistances are in ohms.

TABLE 1

| Reference Number | Specification |
| --- | --- |
| 26 | bc239b |
| 14 | LM387 |
| 16 | LM387 |
| 32 | LM319 |
| 52 | LM741 |
| 130 | LM319 |
| 120 | CD4013 |
| 111 | LM741 |
| 240 | CD4013 |
| 211 | LM741 |
| $R_1$ | 6.8K |
| $R_2$ | 100K |
| $R_3$ | 27K |
| $R_4$ | 27K |
| $R_5$ | 27K |
| $R_6$ | 82K |
| $R_7$ | 15K |
| $R_8$ | 68K |
| $R_9$ | 22K |
| $R_{10}$ | 15K |
| $R_{11}$ | 4.7K |
| $R_{12}$ | 5K |
| $R_{13}$ | 470 |
| $R_{14}$ | 15K |
| $R_{15}$ | 39K |
| $R_{16}$ | 39K |
| $R_{17}$ | 15K |
| $R_{18}$ | 10K |
| $R_{19}$ | 20K |
| $R_{20}$ | 15K |
| $R_{21}$ | 20K |
| $R_{213}$ | 220K |
| $R_{214}$ | 220K |
| $R_{215}$ | 33K |
| $R_{216}$ | 39K |
| $R_{217}$ | 39K |
| $C_1$ | 47uF |
| $C_2$ | 5nF |
| $C_3$ | 1uF |
| $C_4$ | 100nF |
| $C_5$ | 1nF |
| $C_6$ | 100nF |
| $C_7$ | 470uF |
| $C_8$ | 5nF |
| $C_9$ | 5nF |
| $C_{212}$ | 47nF |
| $C_{213}$ | 220nF |

Figure 5:
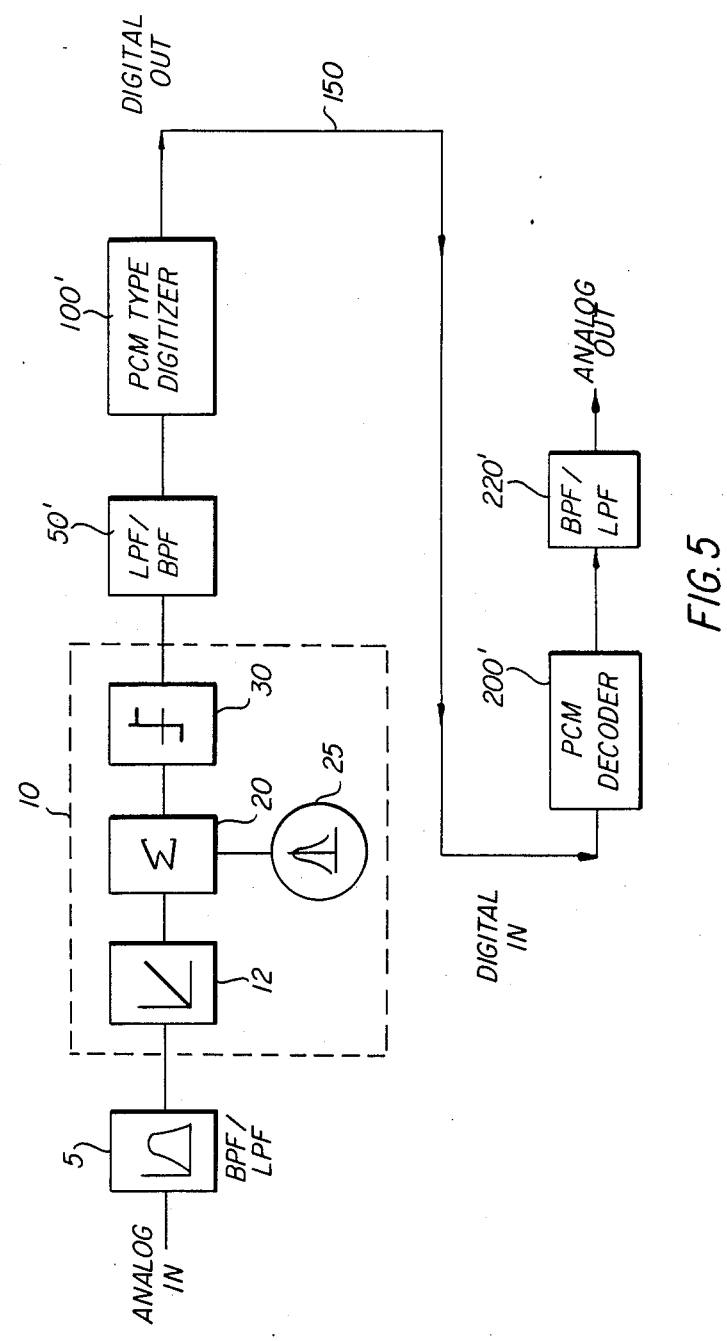
FIG. 5 shows a block diagram for a second embodiment of the system using a PCM type of digitizing output stage.

FIG. 5 shows the block diagram for an alternative embodiment of the invention, wherein PCM signals are transmitted over the transmission channel. As shown, the system comprises a bandpass or low pass filter 5 similar to the corresponding bandpass or low pass filter described with reference to FIGS. 2 and 3, an extrema coder 10, similar to the extrema coder described with reference to FIGS. 2 and 3, a bandpass or low pass filter interface stage 50' and a PCM digitizer 100'. Filter 50' preferably has a bandpass between 300 Hz and 2 kHz, or, if a low pass filter is used, a cut-off frequency of 2 kHz. The PCM digitizer samples the bandpass or low pass filtered extrema coded input signal and converts the input signal into a binary weighted digital output signal which is transmitted over the transmission channel 150 to the receiver, which comprises a PCM decoder 200' and bandpass or low pass filter 220' similar to the corresponding bandpass or low pass filter 220 described with reference to FIGS. 2 and 3. Bandpass or low pass filter 50' elevates low intensity signals which are represented by short distances between transitions in the extrema coded signal, and attenuates high intensity signals which are represented by longer distances between transitions in the extrema coded signal.

One of the main factors affecting the bit rate of a PCM encoder is the sampling frequency that is used. This frequency, according to Nyquist, is chosen to be at least twice as high as the highest frequency component of the waveform to be encoded.

Extrema coding of the analog signal prior to PCM encoding can substantially reduce the bit rate required for transmission of the digital version of the analog signal. The process of extrema-PCM encoding relies on two effects.

First, according to the principles of extrema coding, amplitude values have little significance in the process of human perception. For this reason the number of bits per sample may be reduced by, say, a factor (a) (normally a factor 2 can be attained). The total range over which signals must be detected, however, may be maintained, to fulfill certain expectations of sound variations. The potential requirement to be able to detect speech from silent passages by simply measuring energy levels is one effect that can be enhanced in the process.

When low bandwidth signals are extrema coded and then synchronized to a medium to low bit rate, the silent periods in the signals normally cannot be maintained well, because the low frequency clock signals will synchronize low frequency components of the background noise, which will be noticeable to the human sensory system, e.g., will fall in the audible range. By maintaining a number of quantization levels, however, (instead of one as in U.S. Ser. No. 372,538, above identified) a natural subjective dynamic range of signal levels can be maintained. By providing extrema coding preprocessing, however, the number of quantization levels, and accordingly, the number of bits per sample, can be reduced.

Secondly, the sampling frequency of the PCM coder is determined by the highest frequency components of the input signal. This value is determined by taking a signal and reducing the bandwidth as much as is possible, e.g., by filtering, while maintaining adequate signal quality or intelligibility. For speech signals in the telephone system, this value was established to be about 3400 Hz, giving a sampling rate of about 8 kHz.

By using extrema coding, one may rely on the effect of subjective bandwidth extension to reduce the necessary bandwith. This effect may be explained as follows.

The human hearing system obtains signals from frequencies varying between 20 and 20 kHz and is most sensitive to frequencies between 500 and 5000 Hz. The hearing model that was introduced to explain extrema coding suggests that amplitude and frequency information is not obtained directly but that only certain timing features of the acoustic waveform, the extrema, are significant.

The human hearing system only has a finite amount of capacity. Signals that contain a number of timing features that is in excess of what can effectively be taken in by the human hearing system, are not encoded entirely. Waveforms of frequencies above some 5000 Hz, or complex speech waveforms, are analyzed by taking only a random-like sample of available extrema.

A speech signal that is bandfiltered to a 300–3400 Hz region (or low pass filtered to 3 kHz) will still contain most features of the original waveform within that spectrum. When limiting this signal again, to say, 2 kHz, a large portion of relevant speech information will be eliminated and a high degree of speech intelligibility will be lost.

When a speech signal bandfiltered from 300–3400 Hz is extrema coded, again all timing features of the waveform that may be detected in principle, are present in the extrema coded signal.

By then bandlimiting the extrema coded signal, a number of timing features will be lost. If the extrema coded signal is bandpass or low pass filtered to 2 kHz, not all features or signals in the 2k-3400 Hz region will be eliminated. Some features will still be present due to subjective bandwith extension and also information in the region from 300–2000 Hz will be substantially eliminated by a masking process wherein low frequency signals are masked by high frequency signals brought into the bandpass by the process of subjective bandwith extension. This is explained in the above identified co-pending U.S. patent application Ser. No. 372,538.

The overall result is a signal of much better intelligibility and quality than the 2 kHz band limited nonextrema coded speech signal. It is suggested that this process of limiting a stream of features is close to the process employed by the human hearing system, which is constantly performing various forms of speech compression without effectively losing relevant information.

The signal of low bandwidth may then be digitized. The process of subjective bandwidth extension allows for a compression factor (b), as high as 3 under specific circumstances, in which case the sampling rate and the transmission rate of the signal can be divided by three. The sampling frequency fc, in bits/sec, is then given by the formula:

$$fc = (2\, fmax \cdot n\,), (a \cdot b)$$

where fmax is the maximum frequency component of the analog signal; n is the number of bits/sample; a is the compression factor due to the elimination of amplitude information by extrema coding; and b is the subjective bandwidth extension compression factor due to extrema coding.

It has been found experimentally that the analog waveform digitizer described with reference to FIG. 5, which uses a PCM digitizing output stage, can process speech signals without significant degradation using an 8 kHz sampling rate, and, using a 3 bit code, provide a digital output stream on transmission channel 150 at 24 kilobits per second. Good signal quality can also be obtained at bit rates as low as 12 kilobits per second to 16 kilobits per second, corresponding to a 4 kHz sampling rate using a 3 or 4 bit code.

The output of PCM digitizer 100 could also be coupled to an adaptive predictive coding (APC) or a linear predictive coding (LPC) stage prior to transmission on transmission channel 150. Due to the lower bit rate provided by the PCM extrema encoded signal at the output of the PCM digitizer, the processing of signals using APC or LPC is simplified and the immunity to high intensity noise levels is improved. The system described might also have applications in speech recognition systems, due to the simplification of the input analog waveform by the digitized extrema encoded signal. Additionally, as described previously, the invention might also find application in video information systems and also in systems using maximum entropy coding and transform coding.

Figure 6:
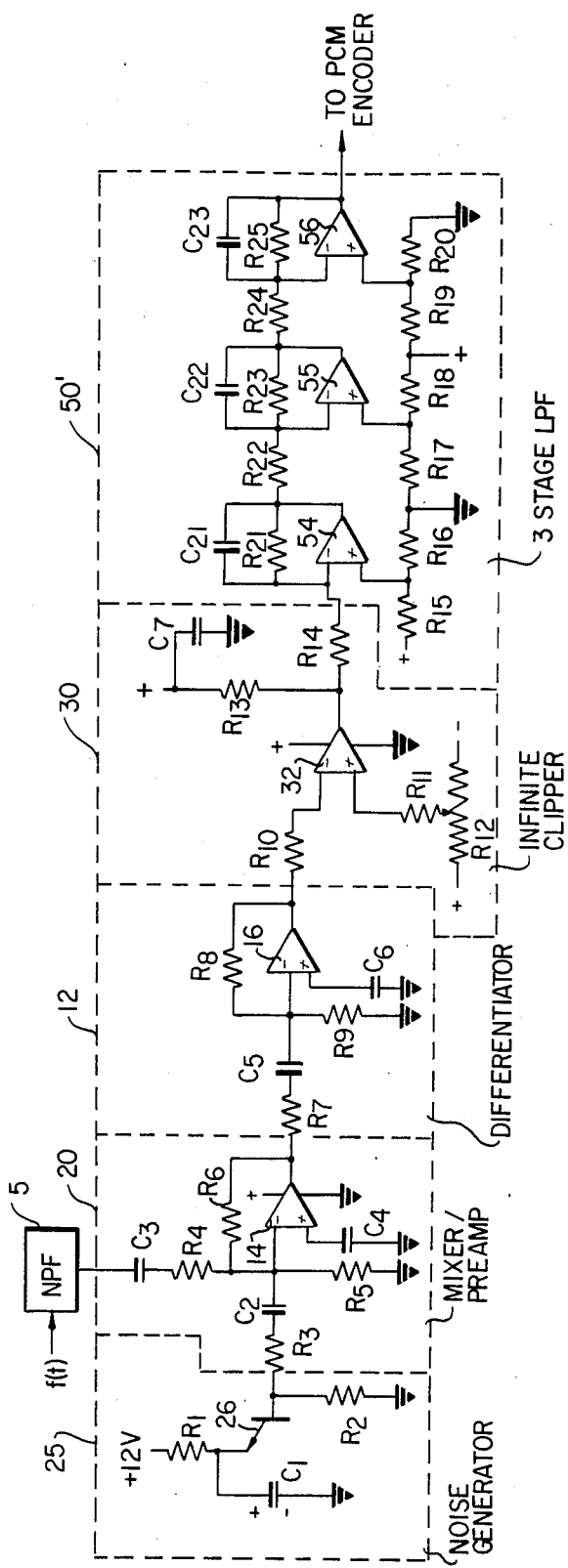
FIG. 6 shows a circuit embodiment for part of the transmitter portion of FIG. 5.
Figure 7:
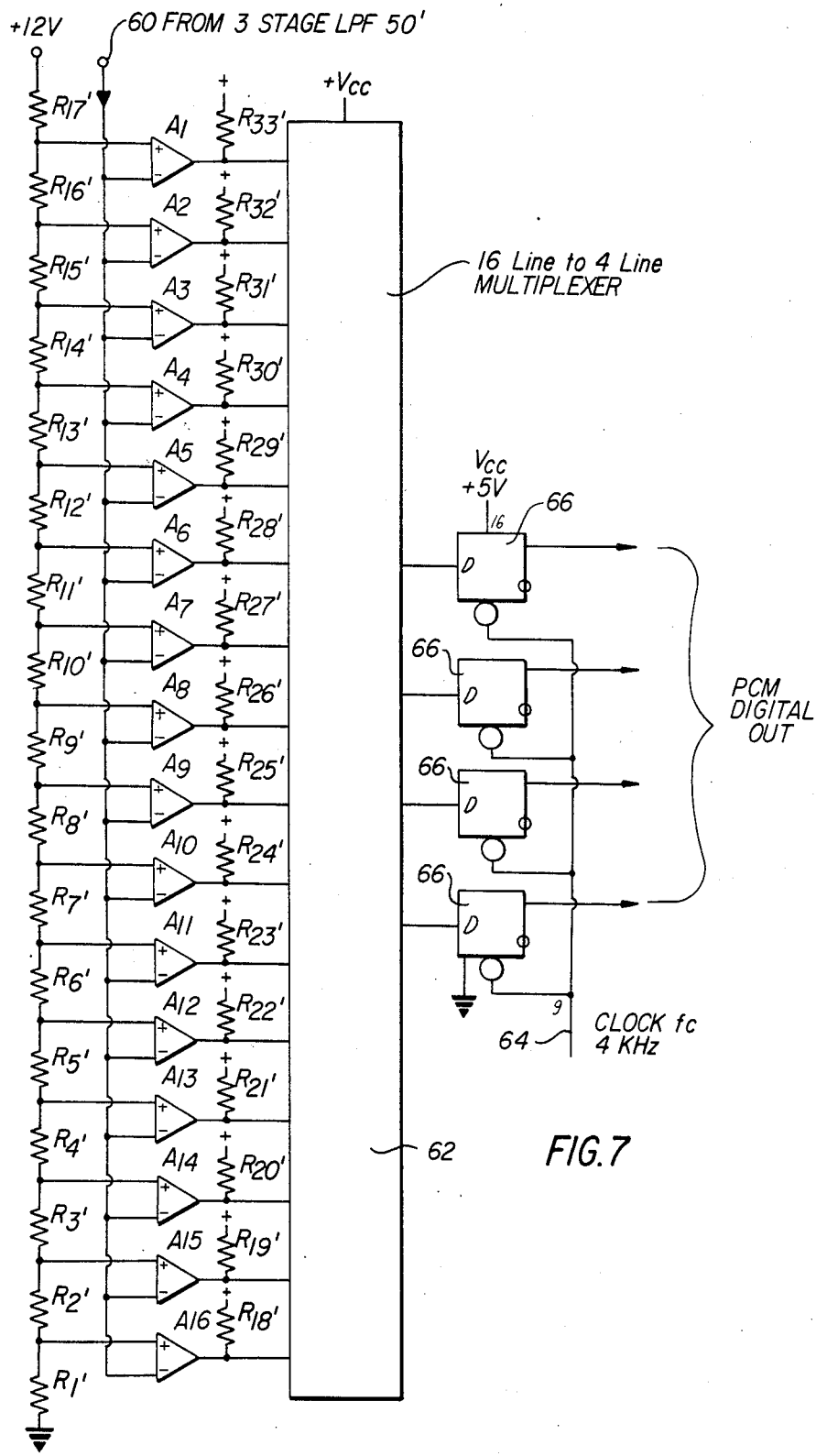
FIG. 7 shows a circuit embodiment for the PCM encoder portion of FIG. 5.
Figure 8:
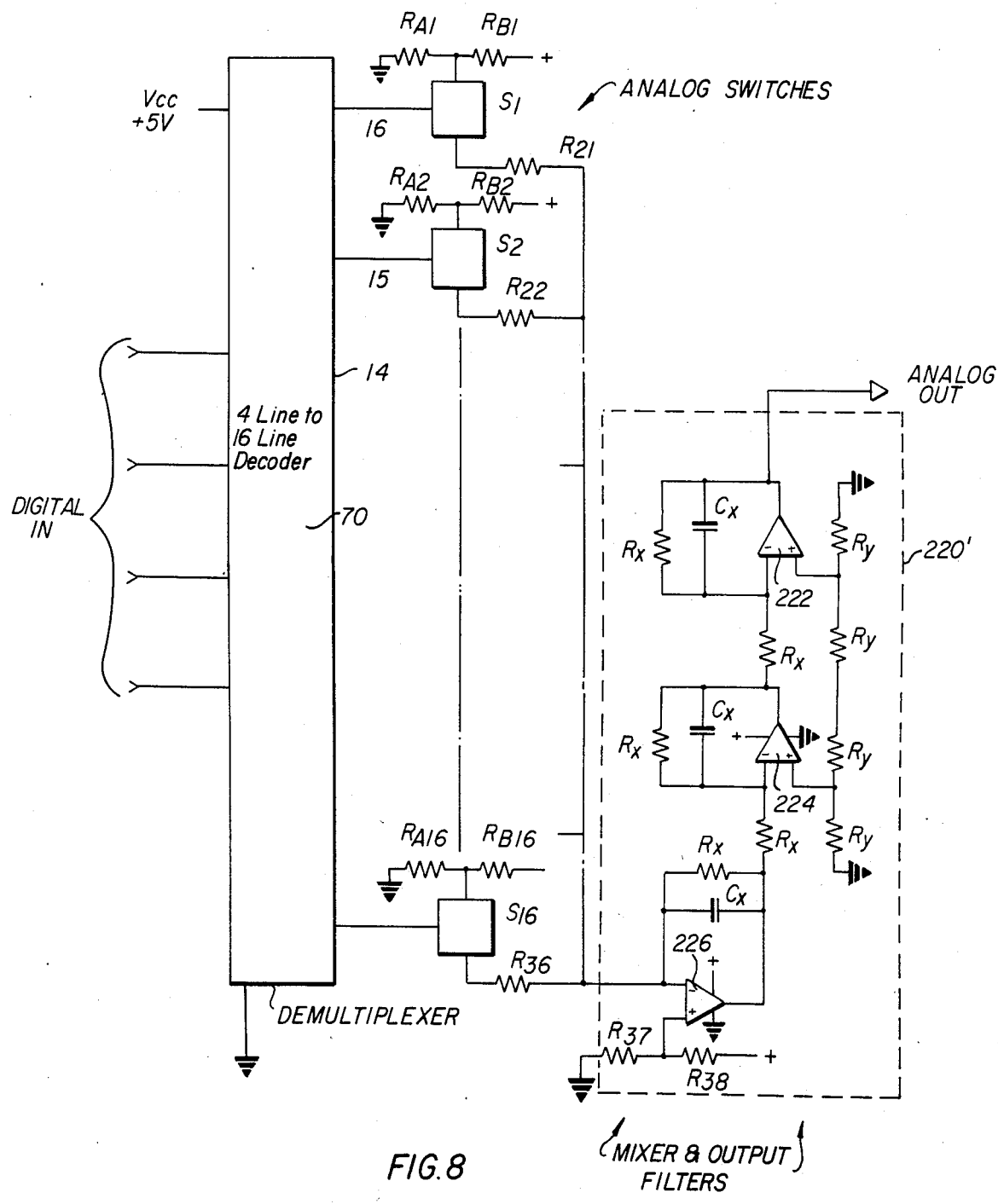
FIG. 8 shows a circuit embodiment for the receiver portion of FIG. 5.

A circuit embodiment for a PCM encoder having extrema coding preprocessing and a 4 kHz sampling rate is shown in FIGS. 6, 7 and 8.

In FIG. 6, the extrema coding preprocessing circuitry is shown. The circuitry is similar to the preprocessing circuitry for the M embodiment of FIG. 3 and comprises a noise source 25 which gives a wide band noise signal of Gausian probability density distribution and having an RMS noise voltage on the order of 10 mV.

As in FIG. 3, the noise signal is mixed with the input signal by means of a resistor network $R_3$-$R_4$ and amplified by operational amplifier 14. The gain of the amplifier 14 is in the order of 10 dB. By using a low gain factor, the bandwidth of the circuit will exceed 1 MHz. This is necessary because a noise signal of wide bandwidth has to be supplied to the next stage. A capacitor $C_2$ is added to suppress low frequency interference. The output of the amplifier 14 is differentiated by an active differentiator circuit 12, comprising an operational amplifier 16, capacitor $C_5$ and resistors $R_7$, $R_8$ and $R_9$.

The output of the differentiator is supplied to the infinite clipping circuit 30, which comprises a comparator 32, which may be a type LM319. By means of multiturn potentiometer $R_{12}$, the zero level at which the comparator is to trigger can be adjusted accurately. The binary signal at the output of the clipper is supplied to a bandpass or low pass filter 50'. In FIG. 6, a three stage low pass filter is provided comprising operational amplifiers 54, 55 and 56. The filter gives a −9 dB point at 1500 Hz, in order to allow for a 4 kHz sampling frequency. At 2 kHz, the attenuation will be over 20 dB. The output of the filter is supplied to a PCM encoder.

FIG. 7 shows one embodiment of the PCM encoder. A ladder network comprising 17 resistors $R_1'$-$R_{17}$, provides 16 voltage points that are supplied to 16 comparator circuits, $A_1$-$A_{16}$. The values of these DC levels are calculated to give an expanded input characteristic. For relatively low levels, many reference levels are available. At high levels, there are few available reference levels.

The signal from low pass filter 50' of FIG. 6 is supplied to point 60 of FIG. 7. This is done in such a manner that for all input levels between zero and 12 V, one comparator must react and give a "1" output.

The 16 line to 4 line multiplexer 62 encodes the output of the specific comparator that provides "1" into a 4 bit binary word. When the input level is altered such that a different comparator is triggered, this 4 bit word will also be changed. The four bits words are synchronized with a clock signal 64 of 4 kHz by four D type flip flops 66, which may be type 74175. The outputs of the flip flops will supply a four bit word that is only altered at the time of the clock pulse, which must occur at the sampling rate.

The digital sequence of four bit words is transmitted or stored but can also be processed, for example by using a speech recognition system. In case of storage or transmission, the digital signal must be decoded into an analog waveform. FIG. 8 shows one embodiment of a PCM decoder which can be used in conjunction with the PCM encoder described, followed by a low pass filter.

The four word digital signal is decoded at the receiver into a 16 line output by means of a demultiplexing circuit 70, for example, a type 74154. Each of the 16 outputs, when negative, must trigger one of 16 analog switches $S_1$–$S_{16}$, which may be type CD4066. When a switch is closed, a connection is made between a summing network $R_{21}$–$R_{36}$ and a specific voltage, provided by the 16 divider networks $R_{A1}$–$R_{B1}$, to $R_{A16}$–$R_{B16}$. The dividers are calculated to give values, corresponding with the average voltage level that could be encoded to give the specific one of sixteen of the outputs. An analog switch that is not triggered will give a very high impedance. In this manner only one out of sixteen possible output voltages is supplied to the summing network.

The low pass filter 220', comprising operational amplifiers 222, 224 and 226, gives a response similar to the filter 50', shown in FIG. 6, but also a slightly wider bandwidth may be used.

The output of amplifier 222 is an analog signal, similar to the signal supplied to the input of the PCM encoder. The signal-to-quantization noise ratio will be substantially lower than for more accurate 256 level PCM, normally used for telephone speech. The difference, however, is practically unnoticeable to the human hearing system.

The effect of the bandwidth extension of extrema coding and the lowering of the sampling frequency to 4 kHz will give a slight subjective degradation, if high quality transducers are used. When normal telephone equipment is used, however, the degradation becomes insignificant.

Component values for the circuit of FIGS. 6, 7 and 8 are shown in Table 2. All resistances are in ohms.

TABLE 2

| Reference Number | Specification |
| --- | --- |
| 26 | bc239b |
| 14 | LM387 |
| 16 | LM387 |
| 32 | LM319 |
| 54 | TL081 |
| 55 | TL081 |
| 56 | TL081 |
| $A_1$–$A_{16}$ | LM339 |
| 62 | 2X74148 |
| 66 | 74175 |
| 70 | 74154 |
| $S_1$–$S_{16}$ | CD4066 |
| 222 | LM741 |
| 224 | LM741 |
| 226 | LM741 |
| $R_1$ | 6.8K |
| $R_2$ | 100K |
| $R_3$ | 27K |
| $R_4$ | 27K |
| $R_5$ | 27K |
| $R_6$ | 82K |
| $R_7$ | 15K |
| $R_8$ | 68K |
| $R_9$ | 22K |
| $R_{10}$ | 15K |
| $R_{11}$ | 4.7K |

TABLE 2-continued

| Reference Number | Specification |
| --- | --- |
| $R_{12}$ | 5K |
| $R_{13}$ | 470 |
| $R_{14}$ | 100K |
| $R_{15}$–$R_{20}$ | 10K |
| $R_{21}$–$R_{25}$ | 100K |
| $R_{1'}$ | 120K |
| $R_{2'}$ | 68K |
| $R_{3'}$ | 33K |
| $R_{4'}$ | 15K |
| $R_{5'}$ | 6.8K |
| $R_{6'}$ | 3.9K |
| $R_{7'}$ | 2K |
| $R_{8'}$ | 1K |
| $R_{9'}$ | 470 |
| $R_{10'}$ | 1K |
| $R_{11'}$ | 2K |
| $R_{12'}$ | 3.9K |
| $R_{13'}$ | 6.8K |
| $R_{14'}$ | 15K |
| $R_{15'}$ | 33K |
| $R_{16'}$ | 68K |
| $R_{17'}$ | 120K |
| $R_{18'}$–$R_{33'}$ | 1K |
| $R_{21}$–$R_{36}$ | 100K |
| $R_{37}$–$R_{38}$ | 10K |
| RX | 10K |
| Ry | 100K |
| CX | 1n |
| $C_1$ | 47uF |
| $C_2$ | 5nF |
| $C_3$ | 1uf |
| $C_4$ | 100nF |
| $C_5$ | 1nF |
| $C_6$ | 100nF |
| $C_7$ | 470uF |
| $C_{21}$–$C_{23}$ | 1nF |

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings, are, accordingly, to be regarded in an illustrative rather than a restrictive sense.

What is claimed is:

1. Apparatus for digitizing an analog waveform comprising:

first means for encoding as an encoded signal only the times of occurrence of maximum and minimum values of the analog waveform, including the times of occurrence of maximum and minimum values of broadband, substantially random noise superimposed on the analog waveform, said noise having a broadband spectrum having frequencies in a frequency range substantially higher than the highest frequency in said analog signal, said encoded signal comprising a binary signal having a series of transitions between two levels, said transitions representing said times of occurrence;

second means coupled to said first means and having said encoded signal as an input, for providing a second signal wherein the bandwidth of said encoded signal is reduced; and third means for converting said second signal into a digital signal and for transmitting said digital signal over a transmission channel to a receiver.

2. The apparatus recited in claim 1, wherein said first means comprises:

differentiating means for converting the times of occurrence of said maximum and minimum values into time axis zero crossing; and clipping means for encoding the time axis zero crossings into said transitions of a binary signal.

3. The apparatus recited in claim 1 wherein said third means comprises delta modulator means.

4. The apparatus recited in claim 3 wherein said second means comprises integrating means for converting said encoded signal into an integrated signal having a substantially constant absolute slope.

5. The apparatus recited in claim 1, further comprising said receiver for receiving said digital signal, said receiver comprising digital to analog converter means for converting said digital signal into a reproduced analog signal.

6. The apparatus recited in claim 3, wherein said receiver comprises delta modulator decoder means.

7. The apparatus recited in claim 6, wherein said delta modulator decoder means comprises filter means coupled to integrator means.

8. The apparatus recited in claim 7, wherein said filter means comprises first means receiving a clock frequency signal for delaying said digital signal for a time equal to a period of said clock frequency signal, second means receiving said clock frequency signal for delaying said digital signal a second time for a time equal to a period of said clock frequency signal and means for combining the delayed signals, whereby a frequency component of said digital signal of one half said clock frequency is substantially eliminated.

9. The apparatus recited in claim 5, further comprising filter means for limiting the bandwidth of said analog signal and wherein said receiver further comprises filter means for limiting the bandwidth of said reproduced analog signal.

10. The apparatus recited in claim 1, further comprising noise generator means for introducing substantially random, broadband noise into said first means when insufficient naturally occurring noise is present in said analog signal.

11. The apparatus recited in claim 1, wherein said third means comprises pulse code modulation means for converting said second signal into a weighted digital signal for transmission over said transmission channel.

12. The apparatus recited in claim 11 wherein said second means comprises filter means for limiting the bandwidth of said encoded signal.

13. The apparatus recited in claim 12, wherein said receiver comprises pulse code modulation decoder means for converting said weighted digital signal into a reproduced analog signal.

14. A method for digitizing an analog waveform comprising:

encoding as an encoded signal only the times of occurrence of maximum and minimum values of the analog waveform, including the times of occurrence of maximum and minimum values of broadband, substantially random noise superimposed on the analog waveform, said noise having a broadband spectrum having frequencies in a frequency range substantially higher than the highest frequency in said analog signal, said encoded signal comprising a binary signal having a series of transitions between two levels, said transitions representing said times of occurrence;

providing from said encoded signal a second signal wherein the bandwidth of said encoded signal is reduced; and converting said second signal into a digital signal and transmitting said digital signal over a transmission channel to a receiver.

15. The method recited in claim 14, wherein said step of encoding comprises:

differentiating said analog signal and noise so as to convert the times of occurrence of said maximum and minimum values into time axis zero crossings; and clipping the differentiated signal so as to encode the time axis zero crossings into said transitions of a binary signal.

16. The method recited in claim 14 wherein said step of converting comprises modulating said second signal with delta modulator means.

17. The method recited in claim 16 wherein said step of providing a second signal comprises converting said encoded signal into an integrated signal having a substantially constant absolute slope.

18. The method recited in claim 14, further comprising the steps of receiving said digital signal at said receiver and converting said digital signal at said receiver into a reproduced analog signal.

19. The method recited in claim 18, wherein said step of converting at said receiver comprises decoding said digital signal with delta modulator decoder means.

20. The method recited in claim 19, wherein said step of converting at said receiver comprises filtering said digital signal and integrating said digital signal.

21. The method recited in claim 20, wherein said step of filtering comprises passing said digital signal through means for eliminating a frequency component of said digital signal of one-half a clock rate associated with said digital signal.

22. The method recited in claim 18, further comprising the step of limiting the bandwidth of said analog signal prior to said step of encoding and limiting the bandwidth of said reproduced analog signal at said receiver.

23. The method recited in claim 14, further comprising the step of introducing substantially random, broadband noise during said step of encoding when insufficient naturally occuring noise is present in said analog signal.

24. The method recited in claim 14, wherein said step of converting comprises converting said second signal into a weighted digital signal for transmission over said transmission channel.

25. The method recited in claim 24 wherein said step of providing comprises passing said encoded signal through filter means so as to limit the bandwidth of said encoded signal.

26. The method recited in claim 25, further comprising the step of converting said weighted digital signal into a reproduced analog signal at said receiver.

27. The method recited in claim 24, wherein said step of converting said second signal into a weighted digital digital comprises converting said second signal into a pulse code modulated signal.

28. An apparatus for digitizing an analog signal comprising:

first means comprising means for detecting the times of occurrence of minimum and maximum values of said analog signal, thereby producing a detected signal, means for providing substantially random noise to said analog signal or said detected signal, said noise being superimposed thereon and having a broadband spectrum having frequencies in a frequency range substantially higher than the highest frequency in said analog signal, said noise being one of injected or naturally present in said analog signal or detected signal, and means coupled to said means for detecting for encoding only said times of occurrence of minimum and maximum values of said analog signal and said superimposed noise as an encoded signal, said encoding means having a bandwidth greater than the bandwidth of said analog signal, said encoded signal containing information sufficient to enable substantial reproduction of said analog signal therefrom, and comprising a binary signal having a series of transitions between two levels, said transitions representing said times of occurrence;

second means coupled to said first means and having said encoded signal as an input, for providing a second signal wherein the bandwidth of said encoded signal is reduced; and third means for converting said second signal into a digital signal and for transmitting said digital signal over a transmission channel to a receiver.

29. The apparatus recited in claim 28, wherein said detecting means comprises:

differentiating means for converting the times of occurrence of said maximum and minimum values into time axis zero crossings; and said encoding means comprises:

clipping means for encoding the time axis zero crossings into said transitions of a binary signal.

30. The apparatus recited in claim 28 wherein said third means comprises delta modulator means.

31. The apparatus recited in claim 28 wherein said second means comprises integrating means for converting said encoded signal into an integrated signal having a substantially constant absolute slope.

32. The apparatus recited in claim 28, further comprising said receiver for receiving said digital signal, said receiver comprising digital to analog converter means for converting said digital signal into a reproduced analog signal.

33. The apparatus recited in claim 32, wherein said receiver comprises delta modulator decoder means.

34. The apparatus recited in claim 33, wherein said delta modulator decoder means comprises filter means coupled to integrator means.

35. The apparatus recited in claim 34, wherein said filter means comprises first means receiving a clock frequency signal for delaying said digital signal for a time equal to a period of said clock frequency signal, second means receiving said clock frequency signal for delaying said digital signal a second time for a time equal to a period of said clock frequency signal and means for combining the delayed signals, whereby a frequency component of said digital signal of one half said clock frequency is substantially eliminated.

36. The apparatus recited in claim 32, further comprising filter means for limiting the bandwidth of said analog signal and wherein said receiver further comprises filter means for limiting the bandwidth of said reproduced analog signal.

37. The apparatus recited in claim 28, wherein said means for providing substantially random noise comprises noise Illegible Line noise into said first means when insufficient naturally occurring noise is present in said analog signal.

38. The apparatus recited in claim 28, wherein said Illegible Line converting said second signal into a weighted digital signal for transmission over said transmission channel.

39. The apparatus recited in claim 28, wherein said second means comprises filter means for limiting the bandwidth of said encoded signal.

40. The apparatus recited in claim 39, wherein said receiver comprises pulse code modulation decoder means for converting said weighted digital signal into a reproduced analog signal.

41. A method for digitizing an analog signal comprising:

detecting the times of occurrence of minimum and maximum values of said analog signal, thereby producing a detected analog signal;

providing substantially random noise to said analog signal or said detected signal, said noise being superimposed thereon and having a broadband spectrum having frequencies in a frequency range substantially higher than the highest frequency in said analog signal, said noise being one of injected or naturally present in said signal or detected signal;

encoding only said times of occurrence of minimum and maximum values of said analog signal and said superimposed noise as an encoded signal, said step of encoding being performed by encoding means having a bandwidth greater than the bandwidth of said analog signal, said encoded signal containing information sufficient to enable substantial reproduction of said analog signal therefrom and comprising a binary signal having a series of transitions between two levels, said transitions representing said times of occurrence;

providing from said encoded signal a second signal wherein the bandwidth of said encoded signal is reduced; and converting said second signal into a digital signal and transmitting said digital signal over a transmission channel to a receiver.

42. The method recited in claim 41, wherein said step of detecting comprises:

differentiating said analog signal so as to convert the times of occurrence of said maximum and minimum values into time axis zero crossings; and said step of encoding comprises:

clipping the differentiated signal so as to encode the time axis zero crossings into said transitions of a binary signal.

43. The method recited in claim 41 wherein said step of converting comprises modulating said second signal with delta modulator means.

44. The method recited in claim 41 wherein said step of providing a second signal comprises converting said encoded signal into an integrated signal having a substantially constant absolute slope.

45. The method recited in claim 41, further comprising the steps of receiving said digital signal at said receiver and converting said digital signal at said receiver into a reproduced analog signal.

46. The method recited in claim 45, wherein said step of converting at said receiver comprises decoding said digital signal with delta modulator decoder means.

47. The method recited in claim 45, wherein said step of converting at said receiver comprises filtering said digital signal and integrating said digital signal.

48. The method recited in claim 47, wherein said step of filtering comprises passing said digital signal through means for eliminating a frequency component of said digital signal of one-half a clock rate associated with said digital signal.

49. The method recited in claim 45, further comprising the step of limiting the bandwidth of said analog signal prior to said step of encoding and limiting the bandwidth of said reproduced analog signal at said receiver.

50. The method recited in claim 41, wherein said step of providing substantially random noise comprises the step of introducing substantially random, broadband noise during said step of encoding when insufficient naturally occurring noise is present in said analog signal.

51. The method recited in claim 41, wherein said step of converting comprises converting said second signal into a weighted digital signal for transmission over said transmission channel.

52. The method recited in claim 51, wherein said step of providing comprises passing said encoded signal through filter means so as to limit the bandwidth of said encoded signal.

53. The method recited in claim 52, further comprising the step of converting said weighted digital signal into a reproduced analog signal at said receiver.

54. The method recited in claim 51, wherein said step of converting said second signal into a weighted digital signal comprises converting said second signal into a pulse code modulated signal.

* * * * *

UNITED STATES PATENT AND TRADEMARK OFFICE
CERTIFICATE OF CORRECTION

PATENT NO. : 4,700,360

DATED : October 13, 1987

INVENTOR(S) : Arie Visser

It is certified that error appears in the above-identified patent and that said Letters Patent is hereby corrected as shown below:

Col. 11, line 53, change "(2 fmax·n),(a·b)" to --2 fmax·n/a·b--

Col. 12, line 51, change "$R_1$' — $R_{17}$" to --$R_1$' — $R_{17}$'--

Col. 16, line 46, change "occuring" to --occurring--

Col. 16, line 61, change "digital" to --signal--

Col. 17, line 68, delete "Illegible Line" and insert --generator means for introducing substantially random, broadband--

Col. 18, line 4, delete "Illegible Line" and insert --third means comprises pulse code modulation means for--

Signed and Sealed this

Twelfth Day of April, 1988

Attest:

DONALD J. QUIGG

Attesting Officer

Commissioner of Patents and Trademarks